J. S. BANCROFT & M. C. INDAHL.
BELT SHIFTING MECHANISM.
APPLICATION FILED DEC. 9, 1916.
1,283,625.
Patented Nov. 5, 1918.
2 SHEETS—SHEET 1.
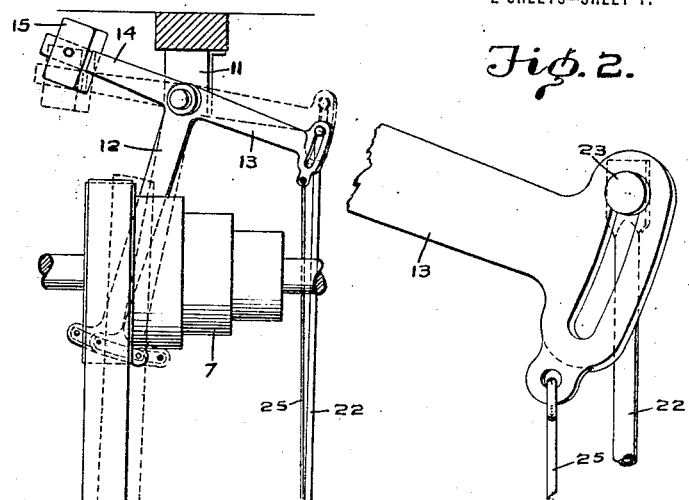
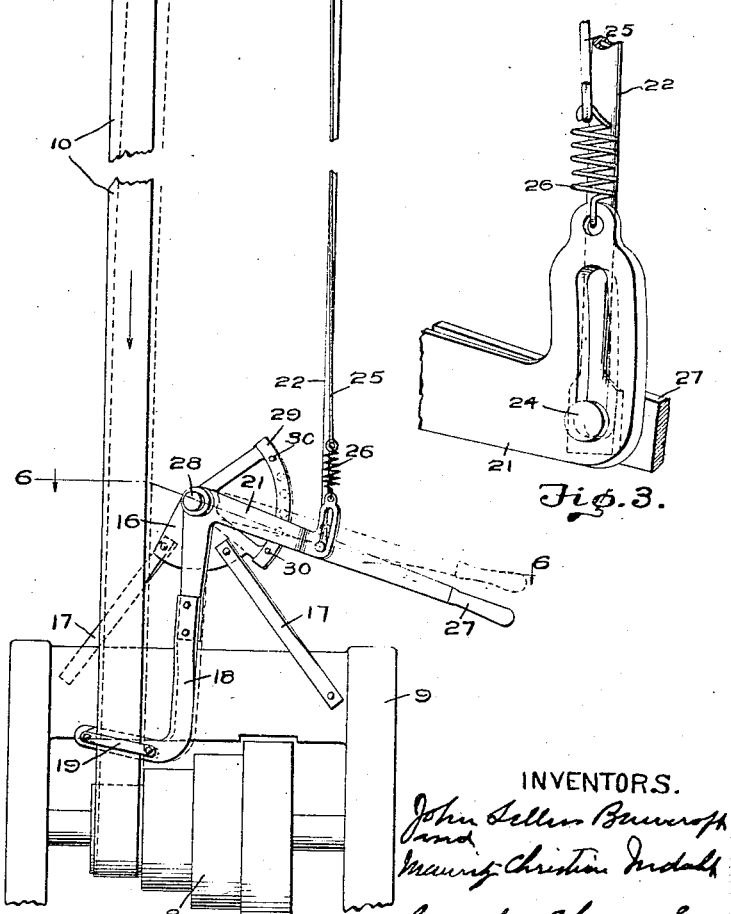
INVENTORS.
*John Sellers Bancroft*
*and*
*Maurig Christian Indahl*
*by Church & Church*
*Their Attorneys.*

J. S. BANCROFT & M. C. INDAHL.
BELT SHIFTING MECHANISM.
APPLICATION FILED DEC. 9, 1916.
1,283,625.
Patented Nov. 5, 1918.
2 SHEETS—SHEET 2.
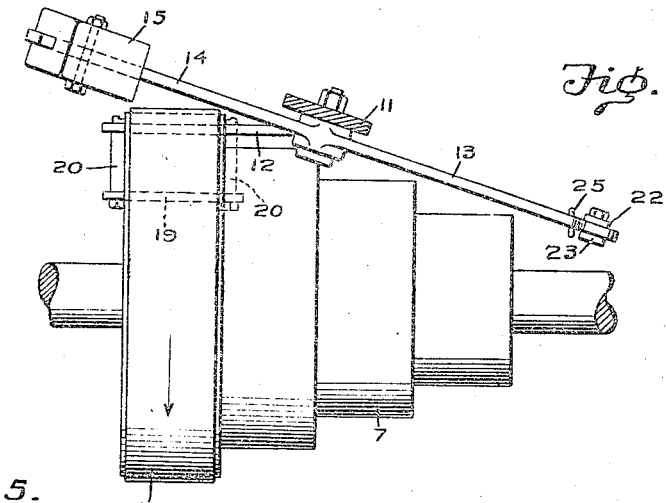
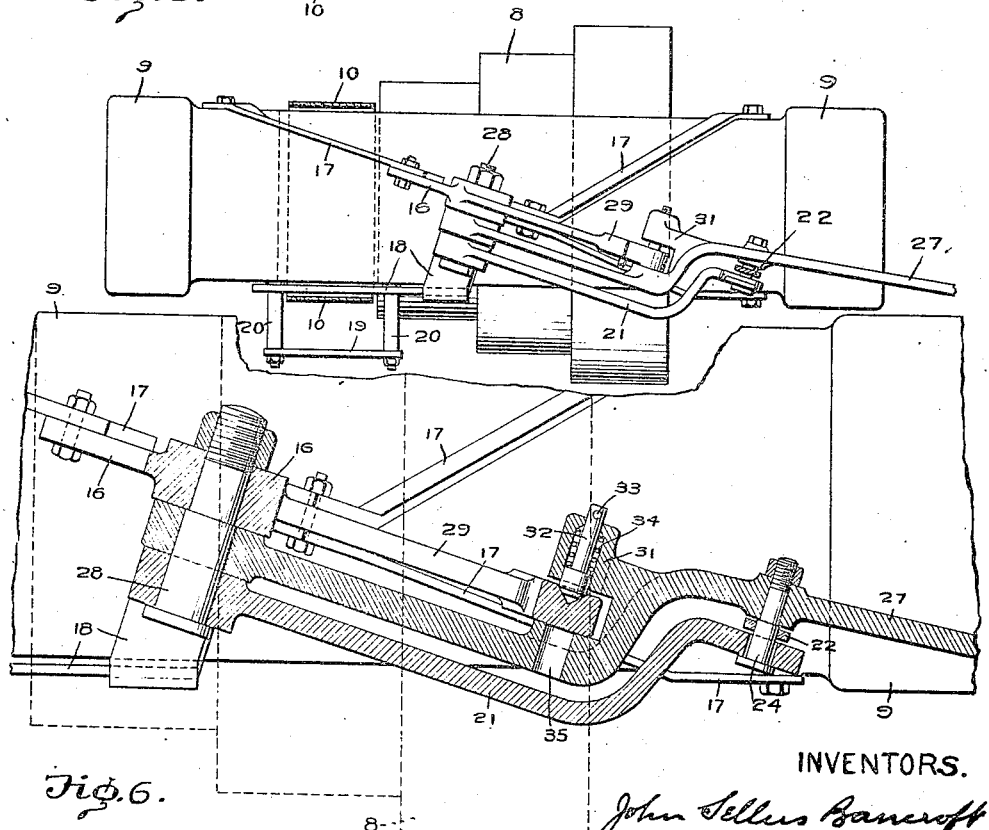
INVENTORS.

UNITED STATES PATENT OFFICE.

JOHN SELLERS BANCROFT AND MAURITZ CHRISTIAN INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

BELT-SHIFTING MECHANISM.

1,283,625.   Specification of Letters Patent.   Patented Nov. 5, 1918.

Application filed December 9, 1916. Serial No. 136,036.

*To all whom it may concern:*

Be it known that we, JOHN SELLERS BANCROFT and MAURITZ C. INDAHL, citizens of the United States, residing at Philadelphia, in the county of Philadelphia and State of Pennsylvania, have invented certain new and useful Improvements in Belt-Shifting Mechanism; and we do hereby declare the following to be a full, clear, and exact description of the same, reference being had to the accompanying drawings, forming part of this specification, and to the characters of reference marked thereon.

This invention relates to mechanism for shifting belts especially those associated with cone pulleys such as the stepped pulleys quite generally used in belt power transmission practice for speed changing purposes. In such practice, the pulleys are usually employed in pairs, the largest step of one pulley being in alinement with the smallest step of the other pulley of the pair and the intermediate steps being graded so that a belt of proper length for one set of alined steps is suitable for any other of the alined steps. These pairs of cone pulleys are practically used in a variety of sizes and in connection with a variety of machines, being employed in some cases for transmitting power from one part of a machine to another part thereof, in which case the two pulleys are usually relatively close together, and in other cases being widely separated as when power is transmitted from a line shaft near the ceiling to a machine located upon the floor. It is the main object of this invention to provide a shifter mechanism for moving the belt laterally from one set of alined steps to another, which mechanism is in general easily adaptable to all cone pulleys no matter how far apart they may be or however located with respect to the mechanisms with which they are associated. Another object is to provide a shifter, the construction of which is not complicated or costly, and which is easy to operate and definite in operation. Other objects will be specifically pointed out or in other manner made apparent in connection with the following description of the embodiment of the invention shown in the accompanying drawings, in which—

Figure 1 shows in side elevation a pair of cone pulleys, a power belt associated therewith and a belt shifting mechanism illustrative of the present invention.

Fig. 2 is an enlarged detail of one end of the upper shifting member and the operating bar therefor.

Fig. 3 is an enlarged detail of one end of the lower shifting member and associated parts.

Fig. 4 is a plan view on a scale larger than that of Fig. 1 of the upper pulley and shifting member, parts being in section.

Fig. 5 is a plan view similar to Fig. 4 but showing the lower pulley and lower shifting devices, parts being in section, and Fig. 6 is an enlarged section through the lower shifting devices, substantially along the line 6—6 of Fig. 1.

The upper four-step cone pulley 7 shown may be regarded as mounted on a line shaft, counter shaft or the like, and capable of being caused to rotate therewith, when desired, by any known arrangement not shown, such as a suitable clutch mechanism. The lower cone pulley 8 may be mounted in the frame 9 of a machine of any kind. The belt 10 is shown coacting with the largest step of the pulley 7 and the smallest step of the pulley 8, and it will be understood that shifting the belt laterally so as to cause it to coact with other pairs of steps will produce as many different speeds for the driven pulley 8 as there are pairs of steps.

Two belt shifting members are provided. The upper one is in the form of a bell-crank lever pivotally mounted upon a bracket secured, if desired, to the ceiling and is provided with an eye for embracing the belt as it approaches the upper pulley 7. This eye is located on the end of the depending arm 12 of the member, the other, power-arm 13 of the bell crank extending laterally of the pulley. A third arm 14 may also be provided for supporting an adjustable counter-weight 15.

The lower shifting member is also shown in the form of a bell-crank lever mounted pivotally on the bracket 16 secured to the machine frame 9 by the straps 17. These straps are preferably made of suitable stock material so that they can be cut off at a length and bent into a shape necessary for attachment to any particular machine frame. The depending arm 18 of the lower shifting member is provided at its end with a belt embracing eye which may be similar in all respects to that provided on the upper shifting member. These eyes, as shown, are formed by securing a strip 19 to the end of the shifter arm by spacer bolts around which rollers 20 are mounted to rotate, the belt 10 passing between the shifter arm and the strip 19 and the edges of the belt being guided between the rollers 20.

The power arm 21 of the lower belt shifting member extends laterally of the pulley 8 and substantially parallel to the arm 13 of the upper shifting member. An operating bar 22 extends between these shifting members, being connected with the power arm of each of them by a sliding lost motion connection yielding in one direction, that is, the direction for movement of the belt from a higher step to a lower one, but unyielding in the other direction, that is, the direction for movement of the belt from a lower to a higher step. This connection may be a pin and slot connection or its equivalent and spring means associated therewith for yieldably maintaining the pin at one end of the slot. As shown the arm 13 of the upper shifter is provided with an arcuate slot through which extends a pin 23 secured to the upper end of the bar 22, the head of this pin being sufficiently large so that it cannot pass through the slot. The arm 21 of the lower shifting member is provided with a similar pin-receiving slot through which the headed pin 24 extends, said pin being secured to the lower end of the bar 22. A tension rod 25 is secured to the arm 13 at its upper end and at its lower end to the upper end of the spring 26, the lower end of which spring is secured to the arm 21. The spring and rod tend to pull the arms 13 and 21 toward each other thus maintaining normally the position in which the pin 23 is at the upper limit of the slot in arm 13 and the pin 24 is at the lower limit of the slot in the arm 21. The operating bar may be moved in any suitable manner. Preferably this is accomplished, as shown, by the provision of an operating hand lever 27 convenient to the operator of the machine, said lever being secured to the bar 22 through the intermediary of the pin 24 and being pivoted on the bracket 16 by the pin 28 which pin also serves as the bearing for the lower shifter member.

The bracket 16 is provided with an arcuate extension 29 against the front side of which the lever 27 is guided to operate within the limits determined by the stop pins 30 secured to the extension and projecting forwardly therefrom. The rear side of the extension is provided with conical detent recesses, properly spaced and located to represent the operating lever positions for each of the sets of pulley steps. A projection 31 of the lever 27 extends around to the rear of the arcuate bracket extension and is provided with a spring pressed detent pin 32 having a conical head to fit the detent recesses. As shown the pin is provided with a shank of a diameter less than that of the head, the shank being slidable in a bored portion of the extension and the head being slidable in an enlarged portion of said bore. The rear end of the pin shank is provided with a cotter pin 33 or the like, to prevent the pin 32 from being forced forwardly out of the bore because of the pressure of the spring 34 which latter surrounds the pin shank and is seated within the bore of larger diameter, its rear end seating upon the shoulder formed by the enlargement of the bore and its forward end acting against the head of the pin 32.

The lever 27 is provided with an aperture 35 in line with the bore in the projection 31, the diameter of said aperture being not less than that of the head of the pin 32, this aperture being desirable so that in assembling, the pin and its spring may be passed through the aperture into the extension bore after which it is secured by the cotter pin 33; this assembling operation should preferably take place before the lever 27 is mounted on the bracket 16.

The belt shifting members are preferably angularly mounted with respect to the pulley shaft, the angle corresponding substantially to that determined by the variation in diameter of the series of pulley steps, (see Fig. 4), so that when operated the eyes of said members will move directly from each belt embracing position to the succeeding one, and the members are preferably so located that the eye of each is, in any position, in proximity to the periphery of the pulley step with which the belt is then associated and embraces that portion of the belt which is moving toward the pulley.

In operating the mechanism, assuming that the pulleys and belt are in motion and the belt is on the steps shown in full lines in Fig. 1, the operating lever 27 is moved upwardly and when so moved it moves the bar 22 through the pin 24 secured to both the lever and the bar, and the latter, because the pin 23 secured thereto is at the upper end of the slot in the arm 13 of the upper shifting member, moves the said member on its pivot and positively presses the belt laterally from its step toward the adjoining step of smaller diameter. At the same time the upward movement of the arm 13 pulls the rod 25 upwardly and produces a tension in the spring 26 secured to the arm 21 of the lower shifting member, and this tends by yielding pressure to move the lower portion of the belt from the smaller step to the next larger step. The position of the parts during the shifting operation may be as shown in dotted lines in Fig. 1. When the upper portion of the belt has been moved a short distance beyond the position shown in dotted lines, it will slip off of the larger step and a slack will momentarily be produced in the belt so as to enable its lower portion to mount from the smaller step to the adjoining larger one; and the said lower portion is urged to do this by the yielding pressure produced by the spring 26. As soon as the eye of the upper positively moved shifting member has reached the proper position for unrestricted travel of the belt on the next lower step, the detent 32 carried by the operating handle will have reached the next depression, into which it is caused to enter by the detent spring 34.

When the lower portion of the belt has been shifted, the spring 26 will have brought the lower shifting member into its normal position in which the lower end of the slot in the arm 21 thereof is seated against the pin 24. For shifting back to the full line position the lever 27 is moved downwardly, thus causing the lower shifting member to be moved positively and the upper member yieldingly in a manner wholly analogous to that explained above. The detent 32 is adapted, because of its conical head and the conical seat with which it coacts, to permit of the manual operation of the mechanism but prevents accidental operation or any displacement of the parts due to jarring, vibration and the like, from the adjusted positions corresponding with definite pulley steps.

It will readily be observed that the structure is capable of being easily adapted to cone pulleys wherever situated with respect to each other and to the other parts of the particular machines with which they are associated and however far apart they may be. The device shown, for example, may be adapted for sets of pulleys located at a greater or less distance apart by simply making the bar 22 and the rod 25 longer or shorter, as the case may be. It is also apparent that the rod 22 may be operated in a manner different from that shown, the connections between the operating rod and the shifting members may be different and other changes may be made without departing from the scope and spirit of the invention as set forth in the appended claims.

We claim:

1. Belt shifting mechanism for cone pulleys, comprising a belt shifting member mounted in proximity to each pulley and having a belt engaging eye at one end thereof, a bar directly connecting the opposite ends of said members by a sliding, lost motion connection and spring mechanism for maintaining each of said connections positive for operating the member in one direction and slidably yielding for operating the member in the opposite direction.

2. Belt shifting mechanism for cone pulleys, comprising a belt shifting member mounted in proximity to each pulley and having a belt engaging eye at one end thereof, a bar directly connecting the opposite ends of said members by a sliding, lost motion connection and spring mechanism for maintaining one of said connections positive and the other slidably yielding for operating the members in one direction and the first of said connections slidably yielding and the other positive for operating the members in the opposite direction.

3. Belt shifting mechanism for cone pulleys, comprising a belt shifting lever pivotally mounted in proximity to each pulley and having a belt engaging eye at one end thereof, a bar directly connecting the opposite ends of said levers by a sliding, lost motion connection and spring mechanism also connecting the said opposite ends of said levers for maintaining the bar connections positive for operating the levers in one direction and slidably yielding for operating the levers in the opposite direction.

4. Belt shifting mechanism for cone pulleys, comprising two belt shifting members, an operating bar therefor, a pin and slot connection between the bar and each of the members and means associated with the pin and slot connections for yieldably maintaining each pin at one end of its slot.

5. Belt shifting mechanism for cone pulleys, comprising a belt shifting member mounted in proximity to each pulley, each of said members including a lever provided with a belt engaging eye, a bar for operating said members, a pin and slot connection between the bar and each of the members, and means associated with the pin and slot connections for yieldably maintaining each pin normally at one end of its slot.

6. Belt shifting mechanism for cone pulleys, comprising a belt shifting member mounted in proximity to each pulley, each of said members including a lever provided at one end with a belt engaging eye and at the other end with a pin-receiving slot, an operating bar, a pin secured to said bar at each end thereof, said pins extending through said slots, and means for yieldably maintaining each pin normally at one end of its slot.

7. Belt shifting mechanism for cone pulleys, comprising a belt shifting member mounted in proximity to each pulley, each of said members including a bell-crank lever provided at one end with a belt-engaging eye and at the other end with a pin receiving slot, a bar, a pin secured to said bar at each end thereof, said pins extending through said slots, a tension rod secured at one end thereof to the slotted end of one of the levers, and a spring connecting the other end of said rod and the slotted end of the other of said levers.

8. Belt shifting mechanism for cone pulleys, comprising a belt shifting member mounted in proximity to each pulley, each of said members including a bell crank lever provided at one end with a belt-engaging eye and at the other end with a pin-receiving slot, a bar, a pin secured to said bar at each end thereof, said pins extending through said slots, means for yieldably maintaining each pin normally at one end of its slot and means secured to one of said pins for moving said pin and thereby operating the bar and the shifting members.

9. Belt shifting mechanism for cone pulleys, comprising belt shifting members each including a bell-crank lever pivotally supported in proximity to a cone pulley and having an arm provided with a belt-engaging eye and an arm provided with a pin-receiving slot, a hand lever pivoted co-axially with one of said bell-crank levers, a bar, a pin extending through the slot of said last mentioned bell-crank lever and secured to both said bar and said hand lever, a second pin extending through the slot of the other of said bell-crank levers and secured to the bar, a tension rod secured at one end thereof to the slotted arm of one of the bell-crank levers and a spring connecting the other end of said rod and the slotted arm of the other of said bell-crank levers.

10. Belt shifting mechanism for cone pulleys, comprising two belt shifting members, an operating bar therefor, a pin and slot connection between the bar and each of the members, means associated with said connections for yieldably maintaining each pin at one end of its slot, a bracket, a hand lever supported thereon and connected with said operating bar and a spring detent pin carried by said hand lever, said bracket being provided with detent recesses for the reception of said pin.

JOHN SELLERS BANCROFT.
MAURITZ CHRISTIAN INDAHL.

Copies of this patent may be obtained for five cents each, by addressing the "Commissioner of Patents, Washington, D. C."